United States Patent
Noureddine

(10) Patent No.: US 9,444,754 B1
(45) Date of Patent: Sep. 13, 2016

(54) METHOD FOR CONGESTION CONTROL IN A NETWORK INTERFACE CARD

(71) Applicant: Chelsio Communications, Inc., Sunnyvale, CA (US)

(72) Inventor: Wael Noureddine, Santa Clara, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 0 days.

(21) Appl. No.: 14/276,947

(22) Filed: May 13, 2014

(51) Int. Cl.
*H04L 12/24* (2006.01)
*H04L 12/801* (2013.01)

(52) U.S. Cl.
CPC ..................................... *H04L 47/35* (2013.01)

(58) Field of Classification Search
USPC ............ 370/229–237, 252–254, 392–395.52
See application file for complete search history.

(56) References Cited

U.S. PATENT DOCUMENTS

| | | | |
|---|---|---|---|
| 6,016,319 A | 1/2000 | Kshirsagar et al. | |
| 6,035,333 A | 3/2000 | Jeffries et al. | |
| 6,118,771 A | 9/2000 | Tajika et al. | |
| 6,167,054 A | 12/2000 | Simmons et al. | |
| 6,181,699 B1 | 1/2001 | Crinion et al. | |
| 6,477,143 B1 * | 11/2002 | Ginossar ................. H04L 47/10 370/230 | |
| 6,724,725 B1 | 4/2004 | Dreyer et al. | |
| 7,573,815 B2 | 8/2009 | Brzezinski et al. | |
| 7,660,264 B1 * | 2/2010 | Eiriksson et al. ............ 370/254 | |
| 7,660,306 B1 * | 2/2010 | Eiriksson et al. ............ 370/392 | |
| 7,675,857 B1 * | 3/2010 | Chesson ....................... 370/235 | |
| 7,706,255 B1 | 4/2010 | Kondrat et al. | |
| 7,742,412 B1 * | 6/2010 | Medina ......................... 370/231 | |
| 7,760,733 B1 * | 7/2010 | Eiriksson et al. ............ 370/392 | |
| 7,761,589 B1 | 7/2010 | Jain | |
| 8,346,919 B1 * | 1/2013 | Eiriksson et al. ............ 709/224 | |
| 2001/0055313 A1 * | 12/2001 | Yin ..................... H04L 12/5602 370/466 | |
| 2003/0099197 A1 * | 5/2003 | Yokota et al. ................ 370/230 | |
| 2003/0219022 A1 * | 11/2003 | Dillon et al. ............ 370/395.52 | |
| 2004/0179476 A1 | 9/2004 | Kim et al. | |
| 2005/0182833 A1 * | 8/2005 | Duffie et al. ................... 709/224 | |
| 2006/0088036 A1 | 4/2006 | De Prezzo | |
| 2006/0092840 A1 | 5/2006 | Kwan et al. | |
| 2006/0114912 A1 | 6/2006 | Kwan et al. | |
| 2006/0251120 A1 | 11/2006 | Arimilli et al. | |

(Continued)

OTHER PUBLICATIONS

Lu et al., "*Congestion control in networks with no congestion drops*," in Proc. 44th Annual Allerton Conference on Communication, Control, and Computing, Monticello, IL, Sep. 2006.

(Continued)

*Primary Examiner* — Edan Orgad
*Assistant Examiner* — Sithu Ko
(74) *Attorney, Agent, or Firm* — Beyer Law Group LLP

(57) ABSTRACT

Congestion detection is implemented on the ingress direction, egress direction, or both directions in a network interface controller. Congestion notification is facilitated between a source and a destination through a network interface controller. In accordance with an aspect, a NIC is configured to label ingress packets—coming from the network—in relation to the presence of congestion. In accordance with another aspect, the NIC is configured to label egress packets—going to the network—in relation to the presence of congestion. A full offload NIC is equipped to operate on the packet labels in the presence of congestion and to react appropriately if it is on the receiving end, sending end, or both.

12 Claims, 5 Drawing Sheets

(56) References Cited

U.S. PATENT DOCUMENTS

| | | | | |
|---|---|---|---|---|
| 2007/0022212 | A1* | 1/2007 | Fan | 709/238 |
| 2007/0071014 | A1 | 3/2007 | Perera et al. | |
| 2007/0201499 | A1* | 8/2007 | Kapoor et al. | 370/412 |
| 2007/0268830 | A1 | 11/2007 | Li et al. | |
| 2008/0025226 | A1* | 1/2008 | Mogul et al. | 370/242 |
| 2008/0025309 | A1 | 1/2008 | Swallow | |
| 2008/0056263 | A1* | 3/2008 | Jain et al. | 370/392 |
| 2008/0062879 | A1* | 3/2008 | Sivakumar et al. | 370/235 |
| 2008/0144503 | A1* | 6/2008 | Persson et al. | 370/235 |
| 2008/0232251 | A1 | 9/2008 | Hirayama et al. | |
| 2009/0052326 | A1* | 2/2009 | Bergamasco et al. | 370/236 |
| 2009/0073882 | A1* | 3/2009 | McAlpine et al. | 370/235 |
| 2009/0116493 | A1 | 5/2009 | Zhu et al. | |
| 2009/0219818 | A1 | 9/2009 | Tsuchiya | |
| 2009/0310610 | A1 | 12/2009 | Sandstrom | |
| 2010/0057929 | A1* | 3/2010 | Merat et al. | 709/231 |
| 2010/0091650 | A1* | 4/2010 | Brewer et al. | 370/229 |
| 2010/0091774 | A1* | 4/2010 | Ronciak et al. | 370/392 |
| 2010/0157803 | A1* | 6/2010 | Rivers et al. | 370/235 |
| 2010/0182907 | A1* | 7/2010 | Pinter et al. | 370/235 |
| 2010/0238804 | A1 | 9/2010 | Jain | |
| 2011/0002224 | A1* | 1/2011 | Tamura | 370/236 |
| 2011/0182194 | A1* | 7/2011 | Jacquet et al. | 370/252 |
| 2012/0079065 | A1* | 3/2012 | Miyamoto | 709/217 |
| 2012/0120801 | A1* | 5/2012 | Ramakrishnan et al. | 370/235 |
| 2012/0155256 | A1* | 6/2012 | Pope et al. | 370/230 |
| 2012/0173748 | A1* | 7/2012 | Bouazizi | 709/231 |
| 2012/0207026 | A1* | 8/2012 | Sato | 370/237 |
| 2012/0250512 | A1* | 10/2012 | Jagadeeswaran | H04L 47/12 370/235.1 |
| 2013/0135999 | A1* | 5/2013 | Bloch et al. | 370/235 |
| 2014/0064072 | A1* | 3/2014 | Ludwig | 370/230 |
| 2014/0126357 | A1* | 5/2014 | Kulkarni et al. | 370/230 |
| 2014/0185452 | A1* | 7/2014 | Kakadia et al. | 370/236 |
| 2014/0185616 | A1* | 7/2014 | Bloch et al. | 370/392 |
| 2014/0254357 | A1* | 9/2014 | Agarwal et al. | 370/229 |
| 2014/0269321 | A1* | 9/2014 | Kamble et al. | 370/236 |
| 2014/0304425 | A1* | 10/2014 | Taneja et al. | 709/235 |
| 2014/0310405 | A1* | 10/2014 | Pope et al. | 709/224 |
| 2015/0029863 | A1* | 1/2015 | Lai | 370/237 |
| 2015/0103659 | A1* | 4/2015 | Iles et al. | 370/235 |

OTHER PUBLICATIONS

Barrass, et al., "*Proposal for Priority Based Flow Control*," May 2008, http://www.ieee802.org/1/files/public/docs2008/bb-pelis-sierpfc- proposal-0508.pdf.

Hugh Barrass, "*Definition for new PAUSE function*," May 30, 2007, Revision 1.0, http://www.ieee802.org/1/files/public/docs2007/new-cm-barrass-pause-proposal.pdf.

Henderson et al., "*On improving the fairness of TCP congestion avoidance*," Global Telecommunications Conference, 1998. GLOBECOM 98. The Bridge to Global Integration. IEEE Issue Date: 1998, pp. 539-544 vol. 1, Nov. 8, 1998-Nov. 12, 1998, Sydney, NSW, Australia.

"*Priority Flow Control: Build Reliable Layer 2 Infrastructure*," © 2009 Cisco Systems, Inc., http://cisco.biz/en/US/prod/collateral/switches/ps9441/ps9670/white_paper_c11-542809.pdf.

\* cited by examiner

METHOD FOR CONGESTION CONTROL IN A NETWORK INTERFACE CARD

TECHNICAL FIELD

The present invention relates to congestion control in a packet switched network. Congestion is a common problem in packet switched networks, which typically lack admission control mechanisms that would prevent packets from entering an oversubscribed network.

BACKGROUND

In the context of Internet Protocol (IP) networks, congestion control is handled at the transport layer, e.g. by the Transmission Control Protocol (TCP). TCP congestion control mostly relies on an implicit congestion indication in the form of lost packets. Mechanisms for explicit congestion notification (ECN) have been proposed and standardized, requiring intermediate packet switches (routers) to explicitly mark bits in the IP header of a packet indicating the incidence of congestion on the path of the packet. The notifications are reflected back by the receiver in the headers of acknowledgment or other packets flowing in the opposite direction. ECN has seen limited deployment and in some networks has shown benefits compared to packet loss and implicit congestion detection. However, there are no mechanisms indicating congestion at the receiving and/or sending node. A window flow control mechanism is available in TCP and is limited to controlling buffer use at the receiving end. Moreover, it is often the case that flow control windows are sized without relation to the available resources at the receiver, such as memory, in part to improve performance when multiple connections are established, but the different connections are active at different times.

SUMMARY

A Network Interface Controller (NIC)—which may be, for example, network interface circuitry, such as on a PCI card connected to a host computer via a PCI host bus—typically includes receive functionality used to couple the host computer to a packet network through at least one interface, usually called a port. NIC circuitry has been an area of rapid development as advanced packet processing functionality and protocol offload have become requirements for so called "smart NICs".

It has become common for receive functionality of NIC cards to parse packet headers and perform operations such as checksum checking computations, filter lookups and modifications such as VLAN tag removal and insertion. Additionally, the receive functionality in some NICs implement protocol offload such as TCP/IP, iSCSI, RDMA and other protocols.

Advances in network connectivity speed increases and system traffic generation and processing capacity are not coupled, and occur as the different relevant technologies develop. For example, Ethernet speeds typically increase in factors of 10× every few years. In contrast, system components, such as host bus, CPU speeds or memory subsystem bandwidth have different increase steps, varying from 2× every few years for the first, to 10% per year for CPUs and somewhat less for memory.

A mismatch may exist between the ingress rate of packets from the network at the receive functionality and the rate at which the host computer is accepting and/or can accept packets on the host bus from the NIC. This mismatch may be temporary, caused by load on the host system processors, or in general can be caused by the offered load exceeding the capacity of the host system. Receive functionality of a NIC can be equipped to detect and indicate such conditions, which remain otherwise mostly unbeknownst to network routers and switches.

In an Ethernet packet switched network, a "PAUSE" mechanism is available to request an immediate neighbor of a node to pause transmission when the node detects congestion. However, this action is limited in scope to the link level, and does not affect the sending rate of the source node, if that node is not the immediate neighbor but is instead connected to the destination through one or more switches. Instead, end-to-end congestion avoidance and control mechanisms are preferred, such as the ones implemented by the Transmission Control Protocol (TCP).

In accordance with an aspect of the invention, congestion detection and explicit notification mechanisms are extended to the receive functionality of the NIC, which is equipped to mark congestion notification bits similarly to intermediate routers. Furthermore, smart NICs which implement receive protocol offload, can themselves reflect the indication back to the sender in packets the NICs generate according to the protocol requirements.

In accordance with another aspect of the invention, congestion detection and notification are extended to transmit functionality of the NIC, whereby the NIC can detect temporary and/or long term mismatch in the traffic sending rate of the node and the traffic sinking rate of its network port.

Independently, server virtualization has been an area of active development, leading to significant virtualization related features being implemented in a NIC. Some NICs have thus incorporated virtual bridges for switching traffic between two virtual machines residing on the host system. In accordance with an aspect of the invention, receive and transmit functionality in a virtual bridge may provide congestion detection and notification capabilities even for connections that are facilitated by the NIC between functions executing on the same host.

ECN has been standardized in the context of TCP/IP networks for more than a decade, but has seen limited deployment and use, perhaps due to the heterogeneity of the network and the large number of entities managing it. However, there is potential for ECN gaining acceptance in the context of datacenters, which combine a large network infrastructure, where congestion may be a significant concern, with a single management authority.

Packet switched networks typically lack admission control mechanisms that operate based on congestion in the network.

In accordance with an aspect of the current invention, receive and/or transmit functionality of network interface circuitry ("NIC") is equipped with ingress and/or egress congestion detection functionality, respectively. In the presence of ingress congestion, the NIC may pass an indication of the congestion (notification) to the receiving protocol stack. In the presence of egress congestion, the NIC may pass an indication of the congestion (notification) to the sending protocol stack. At least one of the receiving protocol stack and the sending protocol stack may be operating on a host coupled to the network by the NIC or operating in the NIC itself (protocol offload).

For example, the notification may be carried in the appropriate fields of packets of a protocol stack when relevant, or as sideband information. For example, in a TCP/IP-compliant network, the notification can be carried in the ECN bits as specified by the relevant standards.

A NIC that implements packet switching functionality can therefore provide an indication of congestion even for traffic that is confined to the NIC itself, such as in virtualized configurations, where the NIC switches packets between virtual machines executing on the host system.

A NIC which implements a network stack (protocol offload NIC) can furthermore act on congestion detection and perform the required congestion avoidance and control actions. In a TCP/IP network, the receiving action may include reflecting the detected congestion appropriately to the sending side. The sending action may include reducing sending speed.

A NIC which implements packet switching functionality and protocol offload can thus be extended to implement both sides of an explicit congestion notification capable network node, such as in virtualized configurations, where the NIC switches packets between virtual machines executing on the host system.

A NIC which, in addition to providing an interface between a network and a host, implements packet switching functionality where the NIC switches packets between network ports may be configured to mark the packets flowing through according to congestion detection, or other criteria.

DETAILED DESCRIPTION

Figure 1:
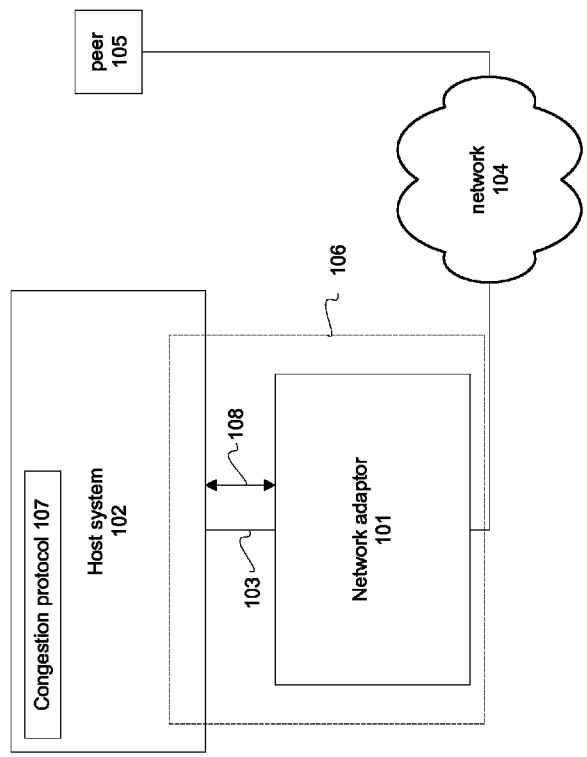
FIG. 1 is a block diagram illustrating a host system with a network adapter configured to detect and indicate congestion.

We now describe a novel application of the packet processing capability of a NIC, equipped with a congestion detection facility. Referring to FIG. 1, a NIC 101 is coupled to a host system 102, using an attachment bus 103. The host system 102 communicates via a network 104 to a peer 105. A portion or all of the NIC 101, perhaps also comprising circuitry on the host system 102, may be considered an interface 106 between the network 104 and the host system 102. The interface 106 may comprise an ingress interface and/or an egress interface.

The NIC 101 can detect congestion on the ingress portion of the interface 106 such as by monitoring the occupancy of relevant state elements, like header or payload FIFOs, or general usage of NIC resources for packet ingress. For example, a payload or header FIFO occupancy threshold can be programmed, such that when the FIFO occupancy exceeds said threshold, the FIFO is considered congested. In another example, a "freelist" of host based receive packet buffers is maintained, and the number of available buffers monitored. When the number of available buffers drops below a certain threshold, the receiving host is considered to be congested. As another example, the NIC 101 may also detect congestion through monitoring the internal state of busses and connections. Based thereon, the NIC 101 may maintain an ingress congestion state that is indicative of the detected ingress congestion, such as indicative of detected congestion episodes. (It is noted that, by "connection," this is not meant to imply that a connection state is necessarily present and/or being maintained at both ends of the "connection.")

According to the maintained congestion state, the NIC 101 may mark packets received during congestion detected episodes. The marking can be passed as sideband (out-of-band) information to the receiving host 102 to be associated with a received packet (e.g., as part of a receive descriptor associated with the packet), or a flow to which the packet belongs, or through setting or clearing appropriate bits in the packet headers. Modifying bits in the packet headers may require the NIC to adjust integrity check values that cover said bits.

The congestion notification markings are then processed by the host 102 according to a congestion protocol 107. Typically, based on the processing the congestion notification markings, the congestion protocol 107 causes one or more congestion indication to be communicated back to a peer 105, using congestion experienced indications. The double arrow 108 indicates this bidirectional passing of congestion information—from the NIC 101 to the host 102, and from the host 102 to the peer 105.

The NIC 101 may also (or instead) detect congestion on the egress interface when processing packets for transmission. Congestion detection may be based on monitoring the state of NIC resources in the transmit direction, similarly to the receive congestion detection. It may include monitoring the network (PAUSE) state of the egress interface. The NIC can, for example, mark the packets in appropriate fields in the headers or communicate the notification back to the host system to be passed to the congestion indication processing 107. The notification can be associated with a packet by including identification information from the packet, such as appropriate network headers, or a flow information if a flow has been associated with the packet or, in general, an identifier associated with the packet. Alternatively, the NIC may mark the packets by modifying relevant bits in the packet headers to indicate congestion experienced. Modifying bits in the headers may require the NIC to recompute or adjust check values that cover the bits.

Figure 2:
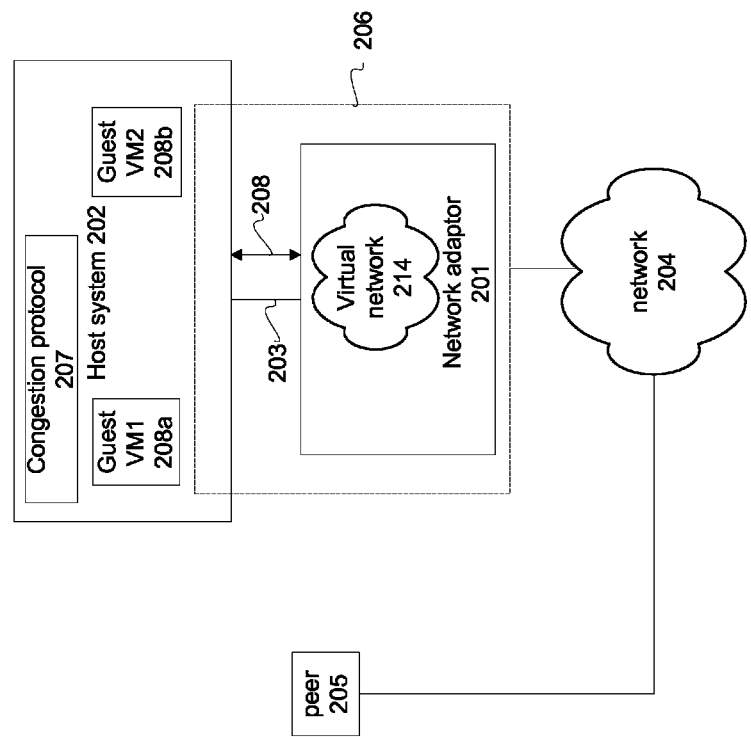
FIG. 2 is a block diagram illustrating how a network adaptor configured to detect and indicate congestion operates as a virtual network adaptor.

In accordance with another aspect, as shown in FIG. 2, a NIC 201 is coupled to a host system 202, using an attachment bus 203. The host system 202 communicates via a network 204 to a peer 205. A portion or all of the NIC 201, perhaps also comprising circuitry on the host system 202, may be considered an interface 206 between the network 204 and the host system 202. The interface 206 may comprise an ingress interface and/or an egress interface.

Like the FIG. 1 arrangement, the NIC 201 can detect congestion on the ingress portion of the interface 206 and congestion on the egress portion of the interface 206. Congestion notification markings may then be processed by the host 202 according to a congestion protocol 207.

In addition, the host 202 may be configured to operate multiple virtual machines or guest functions. The NIC 201 may operate as a "virtual network" 214 between the virtual machines such as guest VM1 208a and guest VM2 208b. Furthermore, similar to the description above with respect to FIG. 1, the NIC 201 may be configured to detect congestion in the virtual network 214, and indicate the detected congestion such as in an inner IP header of VXLAN/GRE/tunnel traffic.

Figure 3:
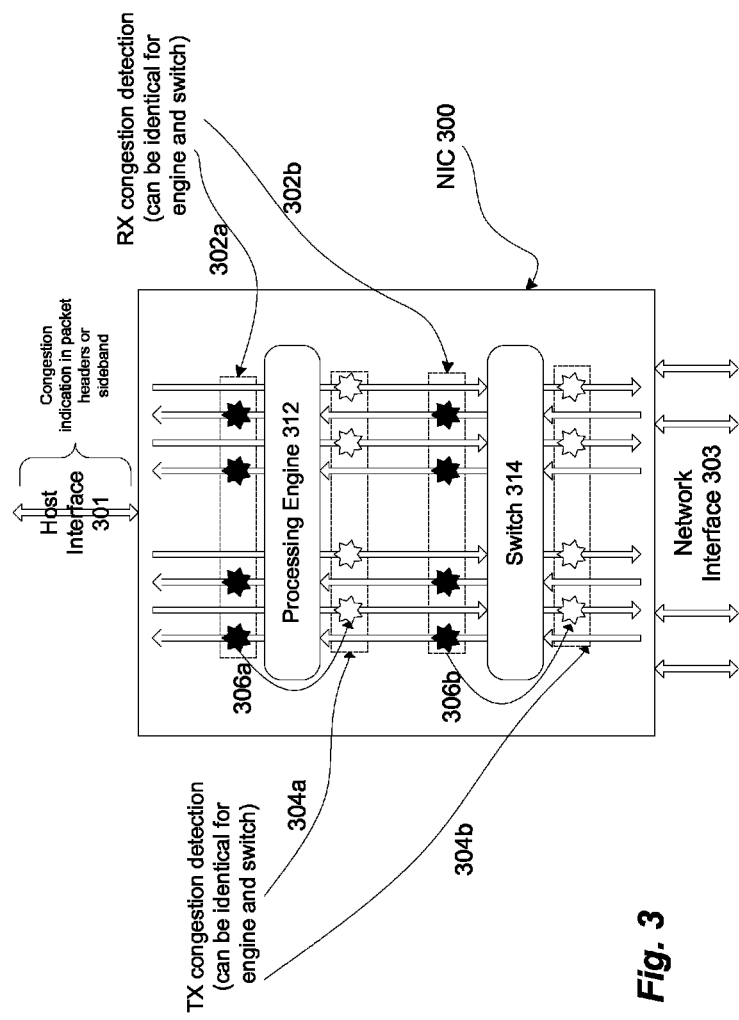
FIG. 3 more specifically shows how the network adaptor may detect congestion, in relation to a processing engine and switch functionality of the network adaptor.

A NIC may also implement a function to switch packets between two entities on the host side, or between an ingress port and an egress port. Packets flowing through the switching functionality may be marked by the NIC according to the presence of congestion. It may be beneficial to implement marking as part of general traffic management (e.g., the congestion marking may not be based on congestion detection exclusively, but may also be based on desired traffic management). FIG. 3 illustrates a NIC 300 that includes a host interface 301 and a network interface 303. The NIC 300 includes processing engine functionality 312 to handle processing of ingress and egress data to a host via the host interface 301 including, for example, implementing the offloading of connection endpoint protocol processing from the host. The NIC 300 may also include switch processing functionality 314 to handle switching of packets. The processing engine functionality 312 and the switch processing functionality 314 may actually be handled by the same processing pipeline.

As indicated in FIG. 3 receive congestion detection 302*a* for the processing engine functionality 312 may be the same as the receive congestion detection 302*b* for the switch processing functionality 314; and transmission congestion detection 304*a* for the processing engine functionality 312 may be the same as the transmit congestion detection 304*b* for the switch processing functionality 314. Furthermore, congestion information may be passed by the processing engine functionality 312 between the receive path and transmit path, including in the case the offloading of connection endpoint protocol processing from the host to the NIC 300. See, for example, arrows 306*a* and 306*b* in FIG. 3, which are indicative of such passing of congestion information. As discussed above relative to FIG. 3, the host interface 301 may be utilized to pass congestion indication information as part of packets provided to the host and/or as sideband information.

Figure 4:
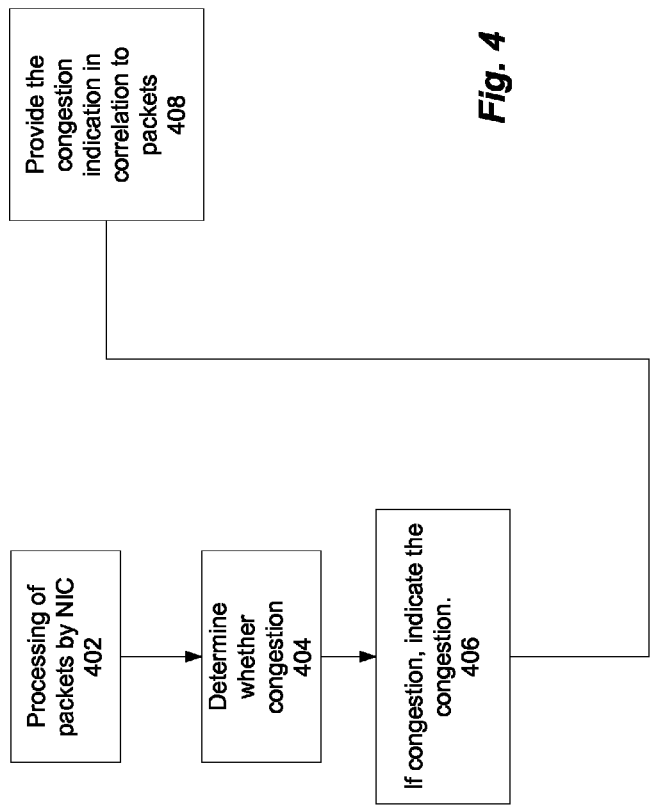
FIG. 4 is a flowchart illustrating an example of the congestion detection and indication process that may be followed.

FIG. 4 is a flowchart illustrating a method in accordance with an aspect of the invention. At 402, the network interface circuitry processes packets. At 404, it is determined if, based on processing the packets, there is congestion relative to the packets. At 406, if congestion has been detected, then the congestion is indicated. At 408, the congestion indication is provided in correlation to the packets for which congestion has been detected. For example, the congestion experienced indication may be provided to the host correlated to the ingress packets, such as including the congestion experienced indication correlated to a flow to which the ingress packets belong. This may include, for example, providing the congestion experienced indication as at least one of information from headers of the ingress packets or a flow identification obtained by the network interface circuitry using a lookup.

Figure 5:
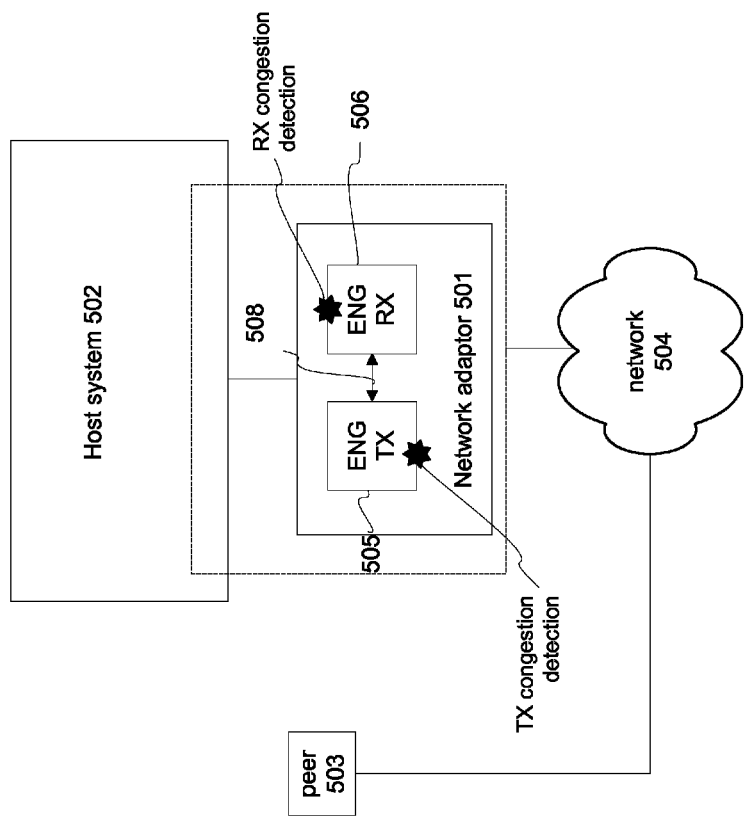
FIG. 5 is a block diagram illustrating a host system with a protocol processing network adapter configured to detect congestion and perform related protocol processing.

FIG. 5 is a diagram illustrating a NIC 501 connecting a host system 502 to a peer 503 through a network 504. The NIC performs receive and transmit network protocol processing, such as TCP/IP offload. The protocol processing is conceptually categorized into transmit 505 and receive 506 processing. The NIC is configured to detect congestion in the receive direction, the transmit direction, or both. A receive "congestion detected" indication may be passed to the transmit processing for appropriate action, e.g. applying a label or setting relevant bits on transmitted packets. A transmit "congestion detected" indication may be passed to the congestion algorithm processing, similarly to relevant indications received on ingress packets. The passing of "congesting detected" indications just described is indicated in FIG. 5 by arrow 508.

What is claimed is:

1. Network interface circuitry configured to couple a host computer and a network such that the host is interoperable with a peer via the network, the network interface circuitry comprising:
    congestion detection circuitry configured to, based on an operating state of the network interface circuitry relative to a transport layer flow of packets being communicated between the host and the peer, detect congestion at the network interface circuitry, relative to the transport layer flow; and
    indication providing circuitry configured to provide an indication of the detected congestion correlated to the transport layer flow,
    wherein the network interface circuitry further comprises protocol processing circuitry configured to perform transport layer protocol processing on packets of the transport layer flow; and
    wherein the congestion detection circuitry is configured to set the congestion experienced indication on a packet to be transmitted from the network interface circuitry as a result of the transport layer protocol processing.

2. The network interface circuitry of claim 1, wherein:
    the packets being communicated between the host and the peer according to the transport layer flow are ingress packets of the transport layer flow from the network to the network interface circuitry; and
    being configured to provide the indication of the detected congestion includes being configured to provide a congestion experienced indication to the host correlated to the ingress packets of the transport layer flow.

3. The network interface circuitry of claim 2, wherein:
    the transport layer flow is a connection that is operating according to a TCP/IP protocol; and
    the indication providing circuitry is configured to provide the indication of the detected congestion correlated to the transport layer flow including providing ECN bits to a receiving stack of the host.

4. The network interface circuitry of claim 3, wherein:
    the host is configured to re-compute the IP header checksum.

5. The network interface circuitry of claim 3, wherein:
    the indication providing circuitry is configured to provide the indication of congestion alongside the packet as an out-of-band communication.

6. The network interface circuitry of claim 1, wherein:
    the packets being communicated between the host and the peer according to the transport layer flow are egress packets from the network interface circuitry to the network; and
    being configured to provide the indication of the detected congestion includes being configured to provide a congestion experienced indication to the peer correlated to the egress packets.

7. The network interface circuitry of claim 6, wherein:
    the protocol processing circuitry is further configured to form the egress packets using transport layer protocol processing functionality of the protocol processing circuitry, and
    the transport layer protocol processing functionality of the protocol processing circuitry is configured to provide the indication of the detected congestion based on operation of the transport layer protocol processing functionality in forming the egress packets.

8. The network interface circuitry of claim 2, wherein:

being configured to provide a congestion experienced indication to the host correlated to the ingress packets includes being configured to provide the congestion experienced indication correlated to a transport layer flow to which the ingress packets belong.

9. The network interface circuitry of claim 8, wherein:

being configured to provide a congestion experienced indication to the host correlated to the ingress packets includes being configured to provide with the congestion experienced indication at least one of information from headers of the ingress packets or a transport layer flow identification obtained by the network interface circuitry using a lookup.

10. The network interface circuitry of claim 1, wherein:

the protocol processing circuitry is further configured to operate as a-link-layer switch, and the congestion detection circuitry and indication providing circuitry are configured to operate in the process of the protocol processing circuitry operating as a link-layer switch.

11. The network interface circuitry of claim 1, wherein:

the protocol processing circuitry is configured to provide a virtual local area network tunnel, and wherein the indication providing circuitry is configured to provide the congestion indication in an inner internet layer protocol header of packets being transported via the virtual local area network tunnel.

12. The network interface circuitry of claim 1, further comprising:

traffic rate management circuitry, and the indication providing circuitry is configured to provide the indication of detected congestion to the traffic rate management circuitry.

* * * * *